United States Patent
Liu

(10) Patent No.: US 7,162,076 B2
(45) Date of Patent: Jan. 9, 2007

(54) FACE DETECTION METHOD AND APPARATUS

(75) Inventor: Chengjun Liu, West Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 10/766,121

(22) Filed: Jan. 27, 2004

(65) Prior Publication Data
US 2004/0190760 A1 Sep. 30, 2004

Related U.S. Application Data

(60) Provisional application No. 60/446,596, filed on Feb. 11, 2003.

(51) Int. Cl.
*G06K 9/62* (2006.01)
*G06K 9/00* (2006.01)

(52) U.S. Cl. ............... 382/159; 382/224; 382/170; 382/190; 382/118

(58) Field of Classification Search ............ 382/159, 382/155, 115, 117, 118, 224, 225, 260, 263, 382/199, 232, 181, 190, 305; 707/1–6
See application file for complete search history.

(56) References Cited

U.S. PATENT DOCUMENTS 5,761,341 A * 6/1998 Go ........................... 382/232

OTHER PUBLICATIONS

"Detecting Faces in Images: a Survey," Yang, Ming-Hsuan et al., IEEE Trans. On Pattern Analysis and Machine Intelligence, v 24, No. 1, Jan. 2002, pp. 34-58.*

International Search Report, dated Mar. 21, 2005.
Chellappa et al.; Human And Machine Recognition of Faces: A Survey; Proc. IEEE; May 1995; vol. 83; No. 5; pp. 705-740.
Dass et al.; Markov Face Models; The Eighth IEEE Int'l Conf. on Computer Vision; 2001; pp. 680-687.
Heisele et al.; Face Detection In Still Gray Images; A.I. Memo AIM-1687; Artificial Intelligence Laboratory; May 2000; pp. 1-25.
Hjelmas et al.; Face Detection: A Survey; Computer Vision and Image Understanding; 2001; vol. 83; pp. 236-274.
P. Ho; Rotation Invariant Real-Time Face Detection And Recognition System; A.I. Memo AIM-2001-010; May 31, 2001; Artificial Intelligence Lab.; pp. 1-24.
Hsu et al.; Face Detection In Color Images; Int'l Conference on Image Processing; 2001; pp. 1046-1049.
Liu et al.; Evolutionary Pursuit And Its Application To Face Recognition; IEEE Trans. Pattern Analysis and Machine Intelligence; 2000; vol. 22; No. 6; pp. 570-582.
Liu et al.; Robust Coding Schemes For Indexing And Retrieval From Large Face Databases; IEEE Trans. on Image Proc.; 2000; vol. 9, No. 1; pp. 1-16.
Liu et al.; A Shape And Texture Based Enhanced Fisher Classifier For Face Recognition; IEEE Trans. on Image Proc.; 2001; vol. 10; No. 4; pp. 1-35.

(Continued)

*Primary Examiner*—Wenpeng Chen
(74) *Attorney, Agent, or Firm*—Kaplan, Gilman, Gibson & Dernier

(57) ABSTRACT

A method and apparatus as disclosed for face detection within images. A new vector, the discriminating feature analysis vector, is introduced to represent an image to be analyzed, from the DFA vector as processed using a Bayesian Classifier technique. The methodology provides a computationally efficient manner in which to detect faces with relatively low probability of error and false detection rate.

24 Claims, 2 Drawing Sheets

OTHER PUBLICATIONS

Liu et al.; Gabor Feature Based Classification Using The Enhanced Fisher Linear Disciminant Model For Face Rec.; IEEE Trans. on Image Proc.; 2002; vol. 11; No. 4; pp. 1-36.

Moghaddam et al.; Probabilistic Visual Learning For Object Representation; IEEE Trans. Pattern Analysis and Machine Intelligence; 1997; vol. 19; No. 7; pp. 1-31.

Mohan et al.; Eample-Based Object Detection In Images By Components; IEEE Trans. Pattern Analysis and Machine Intelligence; 2001; vol. 23; No. 4; pp. 349-361.

Papageorgiou et al.; A General Framework For Object Detection; Int'l Conference on Computer Vision; Jan. 1998; pp. 555-562.

Pentland et al.; View-Based And Modular Eigenspaces For Face Recognition; Proc. Computer Vision and Pattern Recognition; 1994; pp. 84-91.

Phillips et al.; The Feret Database And Evaluation Procedure For Face-Recognition Algorithms; Image and Vision Computing; 1998; vol. 16; pp. 295-306.

Qian et al.; Object Detection Using Hierarchical MRF and MAP Estimation; Proc. Computer Vision and Pattern Recognition; 1997; pp. 186-192.

Rowley et al.; Neural Network-Based Face Detection; IEEE Trans. Pattern Analysis and Machine Intelligence; 1998; vol. 20; No. 1; pp. 1-28.

Rowley et al.; Rotation Invariant Neural Network-Based Face Detection; Proc. IEEE Computer Society Conf. on Computer Vision and Pattern Recognition; 1998; pp. 38-44.

Samal et al.; Automatic Recognition And Analysis Of Human Faces And Facial Expressions: A Survey; Pattern Recognition; 1992; vol. 25; No. 1; pp. 65-77.

Schneiderman et al.; Probabilistic Modeling Of Lcoal Appearance And Spatial Relationships For . . . ; Proc. IEEE Computer Society Conf. on Computer Vision and . . . ; 1998; pp. 1-7.

Schneiderman et al.; A Statistical Method For 3D Object Detection Applied To Faces And Cars; Proc. IEEE Computer Society Conf. on Computer Vision and Pattern . . . , 2000; pp. 1-6.

Sung et al.; Learning And Example Selection For Object And Pattern Detection; A.I.T.R. No. 1572; MIT; Jan. 1996; pp. 1-195.

Sung et al.; Example-Based Learning For View-Based Human Face Detection; IEEE Trans. Pattern Analysis and Machine intelligence; 1998; vol. 20; No. 1; pp. 39-51.

Viola et al.; Rapid Object Detection Using A Boosted Cascade Of Simple Features; Proc. IEEE Computer Society Conf. on Computer Vision and Pattern Recognition; 2001; pp. 1-9.

Yang et al.; Face Detection Using Mixtures Of Linear Subspaces; Proc. Fifth Int'l Conf. on Automatic Face and Gesture Recognition; Mar. 2000; pp. 1-7.

A. Yuille; Deformable Templates For Face Recognition; Journal of Cognitive Neuroscience; 1991; vol. 3; No. 1; pp. 59-70.

K. Fukunaga; Introduction to Statistical Pattern Recognition; Second Edition, pp. 51-253 and 399-507.

* cited by examiner

FACE DETECTION METHOD AND APPARATUS

RELATED APPLICATION

This application claims the benefit of priority to provisional application Ser. No. 60/446,596 ("the '596 application"), filed Feb. 11, 2003. The '596 application is hereby incorporated by reference in its entirety. A copy of the '596 application is attached hereto as an appendix.

TECHNICAL FIELD

This invention relates to image analysis, and more particularly, to an improved method and apparatus for detecting the presence of faces within an image while minimizing the required calculations and maximizing speed and efficiency.

BACKGROUND OF THE INVENTION

Face detection has a variety of applications in government, security, etc. Face detection involves the ability of software and apparatus to examine a composite image and detect the presence of faces within the image. Face detection algorithms are known in the art and are computationally expensive. A variety of techniques utilized in prior art face detection algorithms are described and cited as references 1–28 in the '596 provisional application. One of the main challenges in face detection technology is the ability to discriminate between face and non face images given that the faces may be of any size and located anywhere in the image.

Earlier efforts have been focused on correlation or template matching, matched filtering, subset methods, deformable templates, and similar such techniques. One representative technique, in order to cope with the variability of face images, utilizes six Gaussian clusters to model the probability distributions for face and non-face patterns, respectively. The density functions of the Gaussian distributions are then fed through a multilayer perceptron classifier for face detection. Such techniques are extremely computationally expensive, and subject to relatively high rates of false detection.

It is an object of the invention to decrease the computational cost of performing face detection;

It is also an object of the invention to provide a face detection algorithm that has an acceptable false detection;

It is also an object of the invention to diminish the large number of probability density functions utilized in face detection algorithms;

It is still a further object of the present invention to provide a relatively accurate face detection algorithm.

SUMMARY OF THE INVENTION

The above and other problems of the prior art are overcome in accordance with the present invention, which relates to a novel representation of the input images and the processing of such novel representation using a novel Bayesian classification technique in order to detect faces.

In accordance with the invention, a discriminating feature analysis (DFA) procedure is carried out and DFA vectors are calculated on a variety of training images. The DFA vectors are then utilized to model the face and non-face classes using, for each class, a single multivariate Gaussian probability density function (PDF). The generation of the DFA vectors and the modeling of the face and non-face classes based upon such DFA vectors renders training complete.

Thereafter, an input image is processed to calculate the DFA vectors associated with such input image. The DFA vectors are then processed through a special Bayesian classifier as discussed more fully below in order to control the false detection rate and provide optimal accuracy in performing face detection. The output of the foregoing then classifies portions of the image as face or nonface with a relatively high degree of accuracy and low probability of false detection.

The DFA representation may itself be used in representations other than for face detection algorithm.

DETAILED DESCRIPTION OF THE PREFERRED EMBODIMENT

Figure 1:
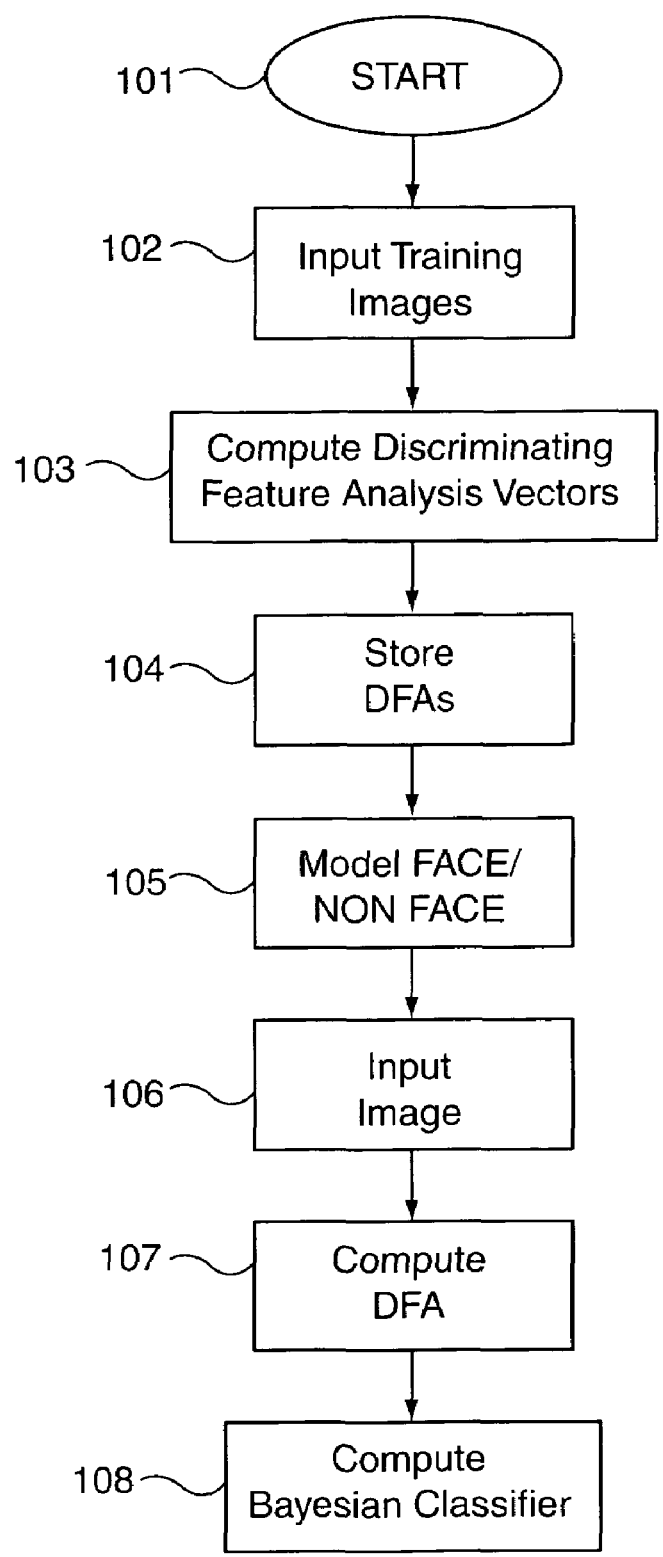
FIG. 1 is a flow chart of the basic steps of the face detection algorithm of the present invention.

FIG. 1 depicts a flow chart of the basic technique implemented by the present invention. The calculations performed by the various portions of FIG. 1 are included in the provisional application that is incorporated herein by reference, and such mathematical equations will not be repeated again herein. For reference, the reader is directed to the copy of the '596 application which is attached hereto as an appendix.

In FIG. 1, the program is entered at start block 101 and training images are input into the system at block 102. In experiments performed in connection with the present invention, the training data for the Bayesian Discriminating Features methodology consisted of 600 FERET frontal face images that were used to model the face and nonface classes. The face class thus contains 1200 face samples after including the mirror images of the FERET data, and the nonface class consists of 4,500 nonface samples, which are generated by choosing the subimages that lie closest to the face class from 9 natural scene images.

This training data is utilized at block 103 in order to compute the discriminating feature analysis (DFA) vector of the training images. The DFA vector is a novel featured vector with enhanced discriminating power for face detection. The DFA representation, shown for example in FIG. 2 hereof, combines the input image, its 1-D Haar wavelet representation, and its amplitude projections. The DFA representation of the training images may be calculated from Equation 6 in the provisional application incorporated herein by reference. The derivation of such equation is shown at pages 5–6 of said provisional. The output of Equation 6 represents the combination of the image, its 1-D Haar wavelet representation, and its amplitude projections. The subject matter of pages 5–6 of the incorporated and attached provisional is reproduced in the following:

3.1 Discriminating Feature Analysis

The discriminating feature analysis derives a new feature vector with enhanced discriminating power for face detection, by combining the input image, its 1-D Haar wavelet representation, and its amplitude projections. While the Haar wavelet representation has been shown effective for human face and pedestrian detection, the amplitude projections are able to capture the vertical symmetric distributions and the horizontal characteristics of human face images.

Let $I(i,j) \in \mathbb{R}^{m \times n}$ represent an input image (e.g. training images for face and nonface classes, or subimages of test images), and $X \in \mathbb{R}^{mn}$ be the vector formed by concatenating the rows (or columns) of $I(i, j)$. The 1-D Haar representation of $I(i, j)$ yields two images, $I_h(i, j) \in \mathbb{R}^{(m-1) \times n}$ and $I_v(i,j) \in \mathbb{R}^{m \times (n-1)}$, corresponding to the horizontal and vertical difference images, respectively.

$$I_h(i,j)=I(i+1,j)-I(i,j)\quad 1 \leq i < m,\ 1 \leq j \leq n \qquad (1)$$

$$I_v(i,j)=I(i,j+1)-I(i,j)\quad 1 \leq I \leq m,\ 1 \leq j < n \qquad (2)$$

Let $X_h \in \mathbb{R}^{(m-1)n}$ and $X_v \in \mathbb{R}^{m(n-1)}$ be the vectors formed by concatenating the rows (or columns) of $I_h(i, j)$ and $I_v(i, j)$ respectively.

The amplitude projections of $I(i, j)$ along its rows and columns form the horizontal (row) and vertical (column) projections, $X_r \in \mathbb{R}^m$ and $X_c \in \mathbb{R}^n$, respectively.

$$X_r(i) = \sum_{j=1}^{n} I(i,\ j) \quad 1 \leq i \leq m \qquad (3)$$

$$X_c(i) = \sum_{i=1}^{m} I(i,\ j) \quad 1 \leq j \leq n \qquad (4)$$

Before forming a new feature vector, the vectors $X$, $X_h$, $X_v$, $X_r$ and $X_c$ are normalized by subtracting the means of their components and dividing by their standard deviations, respectively. Let $\hat{X}$, $\hat{X}_h$, $\hat{X}_v$, $\hat{X}_r$, and $\hat{X}_c$, be the normalized vectors. A new feature vector $\tilde{Y} \in \mathbb{R}^N$ is defined as the concatenation of the normalized vectors:

$$\tilde{Y}=(\hat{X}^t\hat{X}_h^t\hat{X}_v^t\hat{X}_r^t\hat{X}_c^t)^t \qquad (5)$$

where t is the transpose operator, and N=3 mn is the dimensionality of the feature vector $\tilde{Y}$. Finally, the normalized vector of $\tilde{Y}$ defines the discriminating feature vector, $\tilde{Y} \in \mathbb{R}^N$, which is the feature vector for the multiple frontal face detection system, and which combines the input image, its 1-D Haar wavelet representation, and its amplitude projections for enhanced discriminating power:

$$Y = \frac{\tilde{Y} - \mu}{\sigma} \qquad (6)$$

where $\mu$ and $\sigma$ are the mean and the standard deviation of the components of $\tilde{Y}$, respectively.

Once the DFA vectors are calculated for the training images, the system stores the DFA vectors at block 104. Accordingly, by block 104, the entire set of training images has been processed and translated into DFA vectors so that the algorithm can next model the face-class and non-face classes from these DFA representations.

The modeling of the face and non-face classes is represented generally by operational block 105 in FIG. 1. The conditional probability density function of the face class can be estimated using a single multivariate Gaussian distribution, rather than up to six Gaussian clusters as utilized by most prior art systems. The monitoring of the face class is accomplished in accordance with Equation 13 in the incorporated provisional application. The equation which follows can be used to model the face class.

$$\ln[p(Y|\omega_f)] = -\frac{1}{2}\left\{\sum_{i=1}^{M}\frac{z_i^2}{\lambda_i} + \frac{\|Y-M_f\|^2 - \sum_{i=1}^{M}z_i^2}{\rho} + \ln\left(\prod_{i=1}^{M}\lambda_i\right) + (N-M)\ln\rho + N\ln(2\pi)\right\} \qquad (13)$$

Continuing with operational block 105, the nonface class modeling starts with the generation of nonface samples by applying Equation 13 to natural images that do not contain any human faces at all. Those subimages of the natural images that lie closest to the face class are chosen as training samples for the estimation of the conditional probability density function of the nonface class, which is also modeled as a single multivariate Gaussian distribution. The conditional density function of the nonface class is estimated as Equation 18 in the incorporated provisional application. Accordingly, at the completion of block 105, Equations 13 and 18 have already been utilized to calculate the conditional PDFs for both face and nonface classes from a single multivariate Gaussian distribution. Equation 18 follows.

$$\ln[p(Y|\omega_n)] = -\frac{1}{2}\left\{\sum_{i=1}^{M}\frac{u_i^2}{\lambda_i^{(n)}} + \frac{\|Y-M_n\|^2 - \sum_{i=1}^{M}u_i^2}{\varepsilon} + \ln\left(\prod_{i=1}^{M}\lambda_i^{(n)}\right) + (N-M)\ln\varepsilon + N\ln(2\pi)\right\} \qquad (13)$$

The PDFs are stored after being modeled at block 105. The stored PDFs render the system trained and ready to operationally detect faces in input images.

Block 106 is the first step shown in FIG. 1 wherein an actual input image in which a face is to be detected is provided to the system. As previously noted, the system already has the PDFs of the face and nonface classes stored. Upon input of the image, the system calculates the DFA vector associated with the input image. That vector DFA must then be used to classify the image and portions thereof as face or nonface classes.

To perform such classification, control is transferred to block 108 where the BDF method applies the Bayesian classifier for multiple frontal face detection. The Bayesian classifier provided at Equations 19–25 of the incorporated provisional application is executed upon the DFA of the input image. The Bayesian classifier will then determine, according to Equation 25 of the incorporated provisional, whether the image or subimage being examined is a face or a nonface class. The equations 19–25 define what is termed herein a Bayesian classifier. Equations 19–25 and an explanation thereof follow.

3.3 The Bayesian Classifier for Multiple Frontal Face Detection

After modeling the conditional PDFs of the face and nonface classes, the BDF method applies the Bayes classifier for multiple frontal face detection, since the Bayes classifier yields the minimum error when the underlying PDFs are known. This error, called the Bayes error, is the optimal measure for feature effectiveness when classification is of concern, since it is a measure of class separability [3].

Let $Y \in \mathbb{R}^N$ be the discriminating feature vector constructed from an input pattern, i.e., a subimage of some test image (see Sect. 3.1). Let the a posteriori probabilities of face class ($\omega_f$) and nonface class ($\omega_n$) given Y be $P(\omega_f|Y)$ and $P(\omega_n|Y)$, respectively. The pattern is classified to the face class or the nonface class according to the Bayes decision rule for minimum error [3]:

$$Y \in \begin{cases} \omega_f & \text{if } P(\omega_f|Y) > P(\omega_n|Y) \\ \omega_n & \text{otherwise} \end{cases} \quad (19)$$

Note that the Bayes decision rule optimizes the class separability in the sense of the Bayes error, hence should yield the best performance on face detection.

The a posteriori probabilities, $P(\omega_f|Y)$ and $P(\omega_n|Y)$, can be computed from the conditional PDFs as defined in Sects. 3.2.1 and 3.2.2 using the Bayes theorem.

$$P(\omega_f|Y) = \frac{P(\omega_f)p(Y|\omega_f)}{p(Y)}, \quad P(\omega_n|Y) = \frac{P(\omega_n)p(Y|\omega_n)}{p(Y)} \quad (20)$$

where $P(\omega_f)$ and $P(\omega_n)$ are the a priori probabilities of face class $\omega_f$ and nonface class $\omega_n$, respectively, and p(Y) is the mixture density function.

From Eqs. 13, 18, and 20, the Bayes decision rule for face detection is then defined as follows:

$$Y \in \begin{cases} \omega_f & \text{if } \delta_f + \tau < \delta_n \\ \omega_n & \text{otherwise} \end{cases} \quad (21)$$

where $\delta_f$, $\delta_n$, and $\tau$ are as follows:

$$\delta_f = \sum_{i=1}^{M} \frac{z_i^2}{\lambda_i} + \frac{\|Y - M_f\|^2 - \sum_{i=1}^{M} z_i^2}{\Box} + \ln\left(\prod_{i=1}^{M} \lambda_i\right) + (N - M)\ln\rho \quad (22)$$

$$\delta_n = \sum_{i=1}^{M} \frac{z_i^2}{\lambda_i^{(n)}} + \frac{\|Y - M_n\|^2 - \sum_{i=1}^{M} u_i^2}{\Box} + \ln\left(\prod_{i=1}^{M} \lambda_i^{(n)}\right) + (N - M)\ln\varepsilon \quad (23)$$

$$\tau = 2\ln\left[\frac{P(\omega_n)}{P(\omega_f)}\right] \quad (24)$$

$\delta_f$ and $\delta_n$ can be calculated from the input pattern Y, the face class parameters (the mean face, the first M eigenvectors, and the eigenvalues), and the nonface class parameters (the mean nonface, the first M eigenvectors, and the eigenvalues). $\tau$ is constant which functions as a control parameter—the larger the value is the fewer the false detections are. To further control the false detection rate, the BDF method introduces another control parameter, $\theta$, to the face detection system, such that $$Y \in \begin{cases} \omega_f & \text{if } (\delta_f < \theta) \text{ and } (\delta_f + \tau < \delta_n) \\ \omega_n & \text{otherwise} \end{cases} \quad (25)$$

The control parameters, $\tau$ and $\theta$, are empirically chosen for the face detection system.

Note there are two empirically derived control parameters in the BDF equations, $\tau$ and $\theta$, that must be finely tuned to the particular system under consideration. For the experiments conducted with respect to the present invention and described in the incorporated provisional application, the selected values of 300 and 500, respectively, were found to give acceptable performance. However, trial and error based upon the particular training images and anticipated input images may require these values to be adjusted slightly up or down.

Figure 2A:
FIG. 2 shows the discriminating feature analysis (DFA) of face and nonface classes. (a) The first image is the mean face, the second and the third images are its 1-D Haar wavelet representation, and the last two bar graphs are its amplitude projections. (b) The mean nonface, its 1-D Haar wavelet representation, and its amplitude projections. Note that the images and projections in (b) resemble their counterparts in (a) due to the fact that the nonface samples lie close to the face class.
Figure 2B:
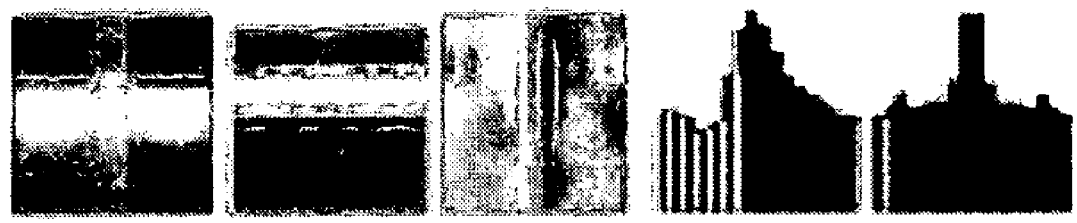

It is noted that the DFA vector shown in FIG. 2 combines the input image, its 1-D Haar wavelet representation, and its amplitude projections. The DFA vector may be useful in other image processing and detection systems, and is not limited to the face detection algorithms of the present invention. It is also noted that the empirically derived parameters discussed above may vary from system to system, and are not limited to those set forth herein or in the incorporated provisional. Various modifications or additions will be apparent to those of skill in the art, and such variations are intended to be covered by the appended claims.

The invention claimed is:

1. A method of representing features in an input image to classify the input image as face or nonface, said method comprising; forming vectors from normalized amplitude projections along rows and columns of said image, concatenating said vectors to arrive at a result, and subtracting a mean and dividing by a standard deviation to normalize said result, said normalized result being a discriminating feature analysis (DFA) vector, said step of concatenating including processing a Haar representation of said input image and said input image itself.

2. The method of claim 1 wherein a plurality of DFA vectors are formed based upon training images.

3. The method of claim 2 wherein said DFA vectors from said training images are used to form models of face and non face classes using a single multivariate probability distribution function (PDF) for each of said face classes.

4. The method of claim 3 wherein said models are stored and used for later analysis of input images.

5. The method of claim 1 further comprising using said DFA vector of said input image to classify the image using a Bayesian classifier.

6. The method of claim 1 wherein said 1-D Harr representation comprises a horizontal difference image defined by the equation:

$$I_h(i,j)=I(i+1,j)-I(i,j), \text{ where } 1\leq i\leq m, 1\leq j<n.$$

7. The method of claim 1 wherein said 1-D Haar representation comprises a vertical difference image defined by the equation:

$$I_v(i,j)=I(i,j+1)-I(i,j), \text{ where } 1\leq i\leq m, 1\leq j<n.$$

8. The method of claim 1 wherein said amplitude projections comprise horizontal projections defined by the equation:

$$X_r(i) = \sum_{i=1}^{n} I(i,j), \text{ where } 1 \leq i \leq m.$$

9. The method of claim 1 wherein said amplitude projections comprise vertical projections defined by the equation:

$$X_c(j) = \sum_{i=1}^{m} I(i,j), \text{ where } 1 \leq j \leq n.$$

10. A method of classifying an input images as being of a first type or of a second type, the method comprising calculating Gaussian PDFs (Probability Density Functions) of image classes of said first type and of said second type using a single multivariate Gaussian PDF, and utilizing said Gaussian PDFs in conjunction with at least one input image to classify said input image as either being of said first type or of said second type, wherein said first type is a face arid said second type is a nonface, wherein the PDFs of the face and nonface classes are calculated only after first calculating a DFA (Discriminating Feature Analysis) vector of each of a plurality of training images wherein said DFA vectors are derived by combining said training images, respective 1-D Haar representations of said training images, and respective amplitude projections of said training images, and wherein said DFA is derived by utilizing the amplitude projections along rows and columns of said images to form a plurality of vectors, normalizing said plurality of vectors, concatenating all of the normalized vectors, and then normalizing the combined vectors.

11. The method of claim 10 wherein a DFA vector of an input image is calculated and a Bayesian discriminator function is used to process the DFA vector of the input image to classify said input image as either a face or nonface.

12. The method of claim 11 wherein said PDFs of the face and non face classes are calculated based upon a sample set of at least several hundred FERET images.

13. The method of claim 10 wherein each said 1-D Haar representation comprises a horizontal difference image defined by the equation:

$$I_h(i,j)=I(i+1,j)-I(i,j), \text{ where } 1\leq i<m, 1\leq j<n.$$

14. The method of claim 10 wherein each said 1-D Haar representation comprises a vertical difference image defined by the equation:

$$I_v(i,j)=I(i,j+1)-I(i,j), \text{ where } 1\leq i\leq m, 1\leq j<n.$$

15. The method of claim 10 wherein said amplitude projections comprise horizontal projections defined by the equation:

$$X_r(i) = \sum_{i=1}^{n} I(i,j), \text{ where } 1 \leq i \leq m.$$

16. The method of claim 10 wherein said amplitude projections comprise vertical projections defined by the equation:

$$X_c(j) = \sum_{i=1}^{m} I(i,j), \text{ where } 1 \leq j \leq n.$$

17. A method, comprising:
modeling a face class of images, wherein images outside said face class of images are nonfaces within a nonface class; and
modeling a subset of said nonfaces which lie closest to said face class, wherein said nonfaces in said subset are support nonfaces, and wherein (1) a 1-D Haar representation; (2) an input image; and (3) amplitude projections are calculated for the images and utilized in said modeling, and wherein said method comprises forming a first set of feature vectors from difference images, normalizing said first set of feature vectors, concatenating said normalized vectors to form a different feature vector, and normalizing said different feature vector.

18. The method of claim 17 wherein said support nonfaces are closest, among said nonfaces in said nonface class, to a decision surface between said face class and said nonface class.

19. The method of claim 17 wherein said modeling said support nonfaces comprises:
modeling support nonfaces as a multivariate normal distribution.

20. The method of claim 17 further comprising:
estimating a conditional density function of said nonface class using a plurality of principal components, an input image, a mean nonface value, and eigenvalues of said nonface class.

21. The method of claim 17 wherein said 1-D Haar representation comprises a horizontal difference image defined by the equation:

$$I_h(i,j)=I(i+1,j)-I(i,j), \text{ where } 1\leq i\leq m, 1\leq j<n.$$

22. The method of claim 17 wherein said 1-D Haar representation comprises a vertical difference image defined by the equation:

$$I_v(i,j)=I(i,j+1)-I(i,j), \text{ where } 1\leq i\leq m, 1\leq j<n.$$

23. The method of claim 17 wherein said amplitude projections comprise horizontal projections defined by the equation:

$$X_r(i) = \sum_{i=1}^{n} I(i, j), \quad \text{where } 1 \leq i \leq m.$$

24. The method of claim 17 wherein said amplitude projections comprise vertical projections defined by the equation:

$$X_c(j) = \sum_{i=1}^{m} I(i, j), \quad \text{where } 1 \leq j \leq n.$$

\* \* \* \* \*